United States Patent
Šafárik et al.

(10) Patent No.: US 10,360,940 B2
(45) Date of Patent: Jul. 23, 2019

(54) METHOD OF PROTECTION OF OPTICAL MEDIA, SUCH AS CDS AND DVDS AGAINST UNAUTHORISED COPYING AND A NON-STANDARD OPTICAL AUDIO DISC AND VIDEO DISC WITH PROTECTION AGAINST LOADING AND PLAYING IN PERSONAL COMPUTERS AND MATRICES FOR MAKING THEREOF

(71) Applicants: Ivan Šafárik, Bratislava (SK); Milan Zachar, Bratislava (SK); Ivan Šútovský, Bratislava (SK)

(72) Inventors: Ivan Šafárik, Bratislava (SK); Milan Zachar, Bratislava (SK); Ivan Šútovský, Bratislava (SK)

(73) Assignee: IMI TECHNOLOGY, S.R.O., Bratislava-Vrakuňa (SK)

( * ) Notice: Subject to any disclaimer, the term of this patent is extended or adjusted under 35 U.S.C. 154(b) by 274 days.

(21) Appl. No.: 15/504,879

(22) PCT Filed: Apr. 4, 2014

(86) PCT No.: PCT/SK2014/050011
§ 371 (c)(1),
(2) Date: Feb. 17, 2017

(87) PCT Pub. No.: WO2015/072933
PCT Pub. Date: May 21, 2015

(65) Prior Publication Data
US 2019/0088284 A1    Mar. 21, 2019

(30) Foreign Application Priority Data

Nov. 13, 2013 (SK) .............................. 50132-2013 U
Feb. 21, 2014 (SK) .............................. 50017-2014 U

(51) Int. Cl.
*G11B 7/007* (2006.01)
*G11B 20/00* (2006.01)
*G11B 27/32* (2006.01)

(52) U.S. Cl.
CPC ........ *G11B 20/00586* (2013.01); *G11B 7/007* (2013.01); *G11B 27/329* (2013.01);
(Continued)

(58) Field of Classification Search
CPC ........ G11B 7/00736; G11B 2020/1265; G11B 27/36; G11B 20/12; G11B 20/1218; G11B 7/24; G11B 2007/00763
(Continued)

(56) References Cited

U.S. PATENT DOCUMENTS 6,146,740 A * 11/2000 Birukawa ................ G11B 5/74
204/192.2
2009/0285070 A1  11/2009 Aris

FOREIGN PATENT DOCUMENTS

| EP | 1763027 A1 | 3/2007 |
| GB | 2386245 A | 9/2003 |
| WO | 2003034424 A2 | 4/2003 |

OTHER PUBLICATIONS

International Search Report dated Oct. 16, 2014 for PCT application No. PCT/SK2014/050011.
(Continued)

*Primary Examiner* — Nabil Z Hindi
(74) *Attorney, Agent, or Firm* — Ohlandt, Greeley, Ruggiero & Perle, LLP

(57) ABSTRACT

Subject-matter is that between an inner edge and an outer edge of a lead-in area, are created by mechanical means grooves in the form of concentric circles around the central axis with the profile of the letter "V" in the protective layer, wherein these grooves have peaks and edges are created in such a way that the groove with the largest possible diameter of the circle does not exceed the inner part of the outer edge and the groove with the smallest possible diameter of the circle does not exceed the inner edge of the lead-in area,
(Continued)

wherein the density of the grooves is such that edges of the grooves are touching each other on the surface of the protective layer and between the individual edges of the grooves there is no area undamaged by the grooves. Non-standard audio discs and video discs are manufactured by pressing from the matrix, they contain lead-in area data area and lead-out area and in the area with the radius from 18.00+1 mm to 23.50+1 mm are provided with the zone of the mechanical protection, which contains a set of grooves in the form of concentric circles, with the profile of the letter "V", which are arranged closely to each other in such a way, that their upper edges are touching.

15 Claims, 9 Drawing Sheets

(52) U.S. Cl.
CPC ............... *G11B 2007/00709* (2013.01); *G11B 2007/00763* (2013.01); *G11B 2220/2537* (2013.01)

(58) Field of Classification Search
USPC ....... 369/47.1, 53.1, 53.21, 59.25, 277, 280, 369/275.3
See application file for complete search history.

(56) References Cited

OTHER PUBLICATIONS

International Preliminary Report on Patentability (IPRP) dated May 17, 2016 for PCT application No. PCT/SK2014/050011.

* cited by examiner

METHOD OF PROTECTION OF OPTICAL MEDIA, SUCH AS CDS AND DVDS AGAINST UNAUTHORISED COPYING AND A NON-STANDARD OPTICAL AUDIO DISC AND VIDEO DISC WITH PROTECTION AGAINST LOADING AND PLAYING IN PERSONAL COMPUTERS AND MATRICES FOR MAKING THEREOF

TECHNICAL FIELD

An invention relates to a method of protection of recorded audio CD-R and film DVD-R (DVD5, DVD9) carriers against their unauthorised copying and infringement of copyright. The invention also relates to optical audio discs and video discs with moulded contents as well as matrices for making the said audio discs and video discs that are provided with protection against copying in personal computers (PC).

STATE OF THE ART

At present no effective protection exists for works distributed on digital audio-CDs and film DVDs and all up to the date types of protection, such as CSS, RC, RCE, APS, UOPs, ARccOS, Macrovision RipGuard as well as other protection features on logical level and the like are unblocked or cracked by means of suitable software installed on a personal computer, laptop, notebook, desktop and/or on other hardware computer assembly containing internal and/or external devices and/or devices for reading of digital audio CDs and/or film DVDs resulting in a high risk of possibility to process the said works as needed by users of computers with CD, DVD drives or other customer. If the user decides or proceeds to further processing of the subject audio work and/or audiovisual work for handling, transfer, sale, publication, distribution and the like without appropriate license agreements and authorisations it causes gross violation of copyright to the works as well as financial loss of authors, distributors, music production companies, film production companies, rentals of the works and all other involved entities harmed by the unauthorised activity.

At present the most used in the world and wide-spread of carriers is a digital audio CD carrier of audio works in music production and a film DVD carrier of audiovisual works in film production. The said carriers can be played in original audio players or CD players, in DVD players, BlueRay players with backward compatibility for playing film DVDs and audio CDs. Furthermore, digital audio CDs and film DVDs can be played in various PC-CD-DVDs, which contain an internal and/or external drive for reading and/or burning data with appropriate software for playing audio works and/or audiovisual works. Film and music companies from around the world distribute their film audiovisual and/or music audio works on the said film DVD and digital audio CD carriers, in standard formats for the respective disc, and there exists no effective protection of the carriers against pirate copy making of audio works and/or audiovisual works, especially related to PC-CD-DVD and the respective software. Patents granted up to the date, e.g. U.S. Pat. Nos. 5,815,484 A, 5,915,018 A, US20090226659 A1, EP1933317A1, WO2005017573 A3, WO2001041138 A2 as well as other not cited patents and applications do not address the problem effectively.

Internet shops of various software companies provide special software such as in general software products having names containing words such as Clone, Copy, Grab, Ripper, Shrink, Decrypter, Extractor, Master Editor and the like, serving to modify audio works and/or audiovisual works executable in majority of standard operating systems, such as operating systems from the families of Windows, Linux, Apple, and their various versions and mutation by means of which the user is capable of making illegal copies of the said works. Furthermore, by means of special software they are able to make various editing, such as converting, format changing into a compressed recording, editing, transformation, and the like. By enabling users of PC-CD-DVD to use software programme tools of copying audio works and/or audiovisual works, of cutting, converting, extracting, transforming and other editing of data on CDs or DVDs, they are given an option of advanced editing of the said works by using similar software tools, and by that harming of copyright occurs and at the same time there is also a high risk of leakage of information of the said arbitrarily processed works, especially to a special internet virtual storage available via the internet most commonly by means of anonymous transfer of the said work (upload) from CD, DVD drives of personal computers (laptop, notebook, iPhone, SmartPhone and the like) to the respective storage accessible over the internet. In today's technologies of the internet connection it is very difficult to trace such a user, especially when connection to the internet as well as actual transfer of modified and/or stolen work (upload) is carried out from a publicly accessible and/or by unsecured and/or partially secured Wifi networks available in various shopping centres, catering establishments, stations, gaming houses and the like that nowadays have higher speed connections. Thereafter, from the said virtual storages available over the internet the works are received (downloaded) by other users (mostly anonymously) from different countries from almost all over the world depending upon a demand for a particular audio work and/or audiovisual work. Statistically, the most common audiovisual works modified are in the English language, to which subtitles in different other languages contained in the audiovisual work are extracted from the audiovisual work. Then the thus modified audiovisual work before its transfer to the virtual storage is usually compressed by means of compression software, for completeness of work, compressed file name extension (e.g.: *.rar, *.zip, and the like) most commonly due to masking from various software filters. Filters serve in storages to disable transfer (upload) of files from users, the file(s) name extension identical with the extension on the filter of the receiving server—storage, e.g. VOB, AVI, XViD, DivX, mp4, flv and the like. In works of music the formats such as MP3, WMA, WAV and the like are the most frequent. Film and music distribution companies as well as authors of audio and/or audiovisual works releasing the said works on digital audio CD, film-DVD carriers for the commercial market have to unwillingly suffer from negative economic impact of pirate activity of such users.

Another group affected by negative economic impact are resellers of commercially produced CD and/or DVD players and/or DVD-CD players with backward compatibility, because nowadays and with present technologies an internal/external BlueRay-DVD-CD drive is a part of majority of PC devices, enabling burning data, by means of which the user is capable of not only watching audio works and/or audiovisual works but in case of suitable software on the respective computer with the suitable PC-DVD-CD drive they are also able to process the works as needed and/or as ordered. Nowadays, presence of computers with DVD-CD drives at homes, work, internet cafes and the like in developed countries is very high. The computer user does not need to be equipped with a commercial CD player and/or DVD player or a BlueRay-DVD-CD player. Producers as well as designers of the software tools serving for processing of audio works and/or audiovisual works very often promote their products as an option for making backups. Furthermore, film DVD rentals also have to bear unwillingly the negative economic impact. The fact that up to now all inventions granted for protection of digital audio-CDs and film-DVDs do not have efficient protection because they are readable in computer DVD-CD drives is the core problem.

Subject-Matter of Invention

The subject-matter of the invention is that a protective element is formed by a set of circle shaped grooves around a central axis having a profile of a letter "V", wherein the grooves have peaks and edges and the groove with the largest possible diameter of the circle is arranged on an inner part of an outer edge of a lead-in area and the groove with the smallest possible diameter of the circle is arranged on the inner edge of the lead-in area and density of grooves is such that the edges of grooves touch each other on the surface of the protective layer and there is no area between individual groove edges undamaged by the grooves.

Grooves are formed into the protective layer, whereas peaks of the grooves extend maximally to a depth up to an adhesive layer.

According to a preferred embodiment, peaks of the grooves only extend to the protective layer.

According to another embodiment, peaks of the grooves extend to a recording layer.

According to yet another embodiment, peaks of the grooves exceed the recording layer towards the adhesive layer.

The first of the attributes relating to the invention is a physical structure of digital audio-CDs and film-DVDs, consisting of individual already standardly defined layers, which quality composition is up to the manufacturers of optical memory media, whereas recording layers of the said carriers are positioned in various depths in the direction of a laser beam. In order to prevent loading and/or reading of digital audio-CDs and/or film-DVDs in PC-DVD-CD we create grooves in the form of the circle in the "Lead-in" area, whereas we can use various depths of the said grooves, which have a "V" shaped profile and which peaks can be up to the "Adhesive layer". The set of circle-shaped "V" profile grooves is created in the "Lead-in" area, which in this case in order to simplify a description of the invention contains the following areas: "Table of Contents—TOC", "Power Calibration Area—PCA", "Recording Management Area—RMA", "Burst Cutting Area—BCA". When reading "Lead-in" in thus modified digital audio-CD and/or film-DVD the PC-DVD-CD device detects thus modified optical storage medium the film-DVD and/or digital audio-CD as unreadable. The first method of application of the present invention utilises an error rate for loading and/or reading by the laser beam in the lead-in area through the created grooves in the form of circles with the "V" profile, which are not applied into the depth of the recording layer. Recordings on the optical storage media are recorded in a shape of a spiral. The laser beam passes through the said grooves in the form of the circle in the direction of the spiral in an attempt to load data from the recording layer, whereas the sides of grooves that are of the "V" profile diffuse the laser beam of the track so that the drive of the PC-DVD-CD device is unable to load and/or read the data correctly. The second method of application of the present invention again uses the error rate in loading and/or reading by the laser beam in the lead-in area through created grooves in the form of the circles with the "V" profile, which are applied through the recording layer and/or recording layers to the depth of the adhesive layer. Thus created grooves in the form of the circles with the "V" profile damage data in the recording layer and/or recording layers and again, as in the first method, when loading data the laser beam is scattered to a wrong direction.

Another subject-matter of the present invention is a non-standard optical audio disc and a video disc that cannot be played in the internal or external drive of a personal computer or notebook, but can be played solely in CD, DVD and BlueRay players. These are branded CD, DVD and BlueRay players, which do not use drives designed for personal computers, notebooks and the like. The non-standard optical audio discs and the non-standard optical video disc under the present invention can be played only in CD and DVD players. The said discs can be played in all desktop, portable and in-car players from branded manufactures. Manufacture of non-standard optical audio discs and video discs, which cannot be played in the internal or external drive of the personal computer or of the notebook, but can be only played in CD and DVD players is the only effective protection against copying of standard CDs and DVDs by means of internal and external drives of personal computers.

DVD (Video Disc) Non-Standard DVD

The non-standard optical video disc with protection against loading and playing in personal computers is manufactured by moulding from a matrix. Its nature is, that the area with a radius from 18.00±1 mm to 23.50±1 mm is provided with a zone of the mechanical protection, which contains a set of grooves in the form of concentric circles with the profile of the letter "V", which are arranged closely to each other in such a way, that their upper edges touch each other.

The subject-matter is to create a non-standard DVD, on which in the "burst cutting area" and partially also in the "lead-in area" were created concentric circles according to the Slovak patent application PP 50132-2013, which would prevent reading in internal and external drives in PCs as well as in the non-branded CD and DVD players that use CD and DVD drives designed for PCs. The original CD and DVD drive designed for players has a loading tray with moulded hollows for placing discs of the diameters of 80 and 120 mm.

Another subject-matter of the present invention is a matrix for moulding non-standard optical video discs with protection against loading and playing in personal computers. The nature of the said matrix is that in the area with the radius from 18.00±1 mm to 23.50±1 mm it is provided with a zone of the mechanical protection, which contains a set of grooves in the form of concentric circles with the profile of the letter "V", which are arranged closely to each other in such a way, that their upper edges touch each other.

CD (Audio Disc) Non-Standard CD

The subject-matter of the present invention is a non-standard optical audio disc with protection against loading and playing in personal computers manufactured by pressing from the matrix. Its nature is that in the area with the radius from 18.00±1 mm to 23.50±1 mm it is provided with the zone of the mechanical protection, which contains a set of grooves in the form of concentric circles with the profile of the letter "V", which are arranged closely to each other in such a way, that their upper edges touch each other.

On non-standard audio disc the zones "PCA" (Power Calibration Area) and "PMA" (Power Memory Area) and a part of the lead-in area are provided with the grooves in the form of concentric circles according to the Slovak patent application PP 50132-2013, which prevent reading in internal and external drives of computers as well as playing in non-branded CD players that are used by personal computer drives.

Another subject-matter of the present invention is the matrix for moulding non-standard optical audio discs with protection against loading and playing in personal computers. The nature of the matrix is that in the area with the radius from 18.00±1 mm to 23.50±1 mm it is provided with the zone of the mechanical protection, which contains a set of grooves in the form of concentric circles with the profile of the letter "V", which are arranged closely to each other in such a way, that their upper edges touch each other.

In manufacture of matrices for pressing non-standard audio discs the "PCA", "PMA" and the "lead-in area" from standard recordable CD-R and the data area and the "lead-out area" of the pressed CD-ROM are used as the master.

In manufacture of matrices for moulding the non-standard video disc the "burst cutting area" and "lead-in area" of the standard recordable DVD-R and the data area and the "lead-out area" of the pressed DVD-ROM are used as the master.

Manufacture of matrices for pressing one layered (standard DVD 5) and two-layered (standard DVD 9) non-standard video discs is identical. Thus manufactured non-standard optical audio and video discs are hybrids of industrially manufactured standard CD-Rs with CD-ROMs and DVD-Rs with DVD-ROMs.

Non-standard audio discs and video discs are manufactured by moulding and the protection feature against playing and copying in personal computers, notebooks and the like can be also applied additionally on the pressed optical hybrid (non-standard) audio and video discs. Likewise, the above mentioned protection feature can be applied to the matrix in its manufacture and by that said protection element will be moulded directly into the hybrid (non-standard) audio and video discs. The same method of manufacture applies also in production of hybrid (non-standard) two layered video discs.

The advantage of the present invention is that if thus modified digital audio-CD and/or film-DVD is inserted into the CD player and/or the DVD player and/or the "BlueRay-DVD-CD" player, then in case of non-readability of the "Lead-in" area, which in this case for simplification includes the areas: TOC, PCA, RMA, BCA, hereinafter for all areas only referred to as the "Lead-in", then the player procedurally skips reading of the non-readable lead-in area starts reading data from the "Data Recordable Area". In case there is a compilation of audio works and/or audiovisual works created in the "Data Recordable Area" on the digital audio-CD and/or film-DVD, then a commercially manufactured player will load and play the respective structure of the digital audio-CD and/or film-DVD.

BRIEF DESCRIPTION OF PICTURES ON THE DRAWINGS

Illustration of the present invention is on the attached drawings that illustrate the following:

FIG. 1 illustratively shows certain areas of the optical medium,

FIG. 2 illustratively shows a simple design of a single-sided single layer optical medium (DVD-R:DVD5) in a cross-sectional view;

FIG. 3 illustratively shows a simple design of a single-sided dual layer optical medium (DVD-R:DVD9) in a cross-sectional view;

FIG. 4 illustratively shows a simple design of a single-sided optical medium (CD-R) in a cross-sectional view;

FIG. 5 illustratively shows a cross-sectional view of an optical storage medium with particular areas;

FIG. 6 illustratively shows a view on the central part of the optical storage medium;

FIG. 7 illustratively shows an enlarged section of the "Lead-in" area of the optical storage medium.

FIGS. 8, 9, 10, 11 and 12 illustratively show a simple section of the optical storage medium with grooves.

Figure 15:
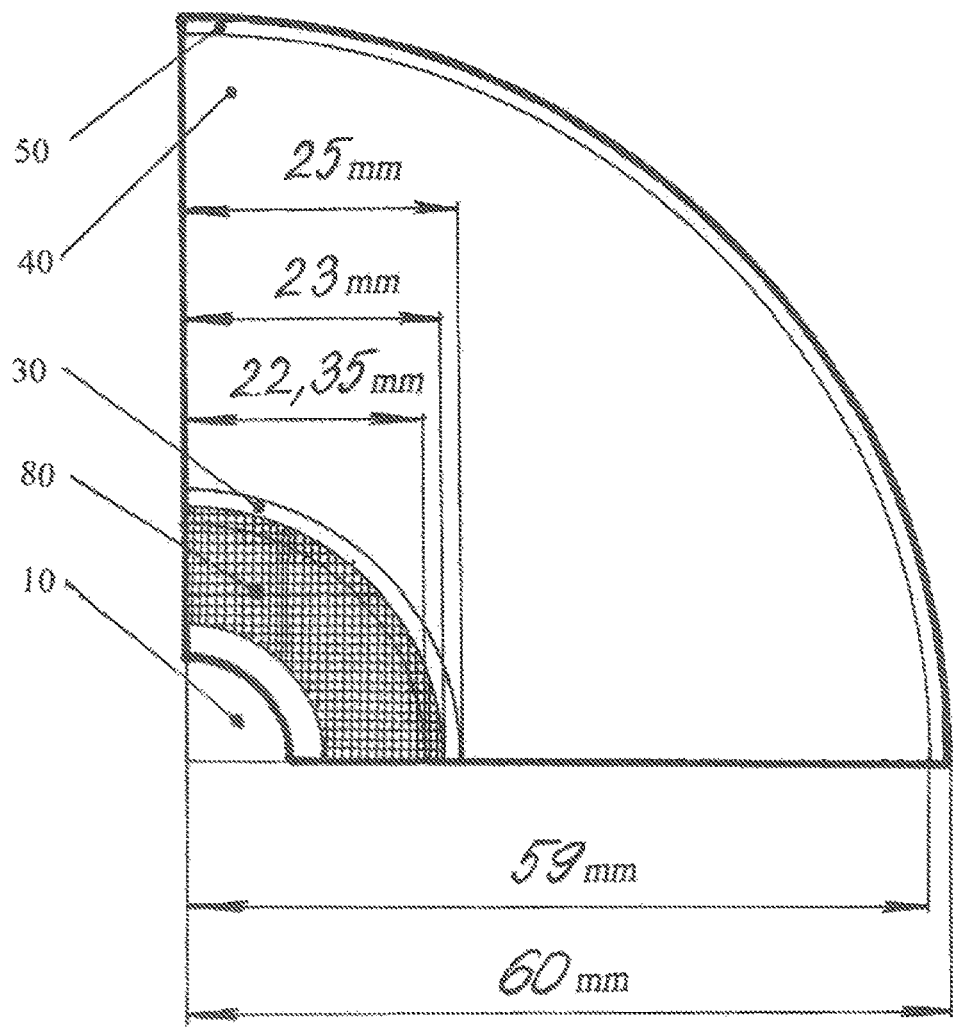

FIG. 15—a cutting from a non-standard audio disc

Figure 16:
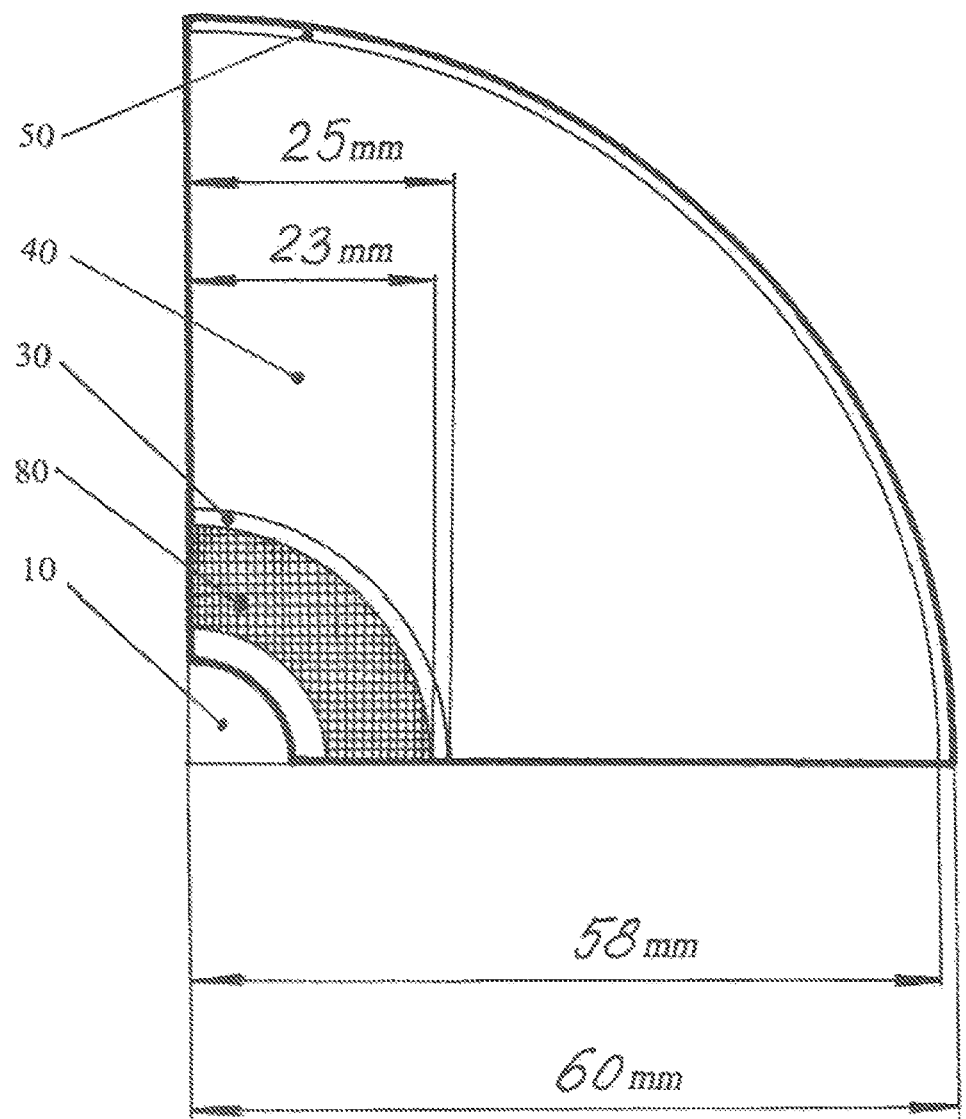

FIG. 16—a cutting from a non-standard video disc

EXEMPLARY EMBODIMENT

Example 1

Figure 1:
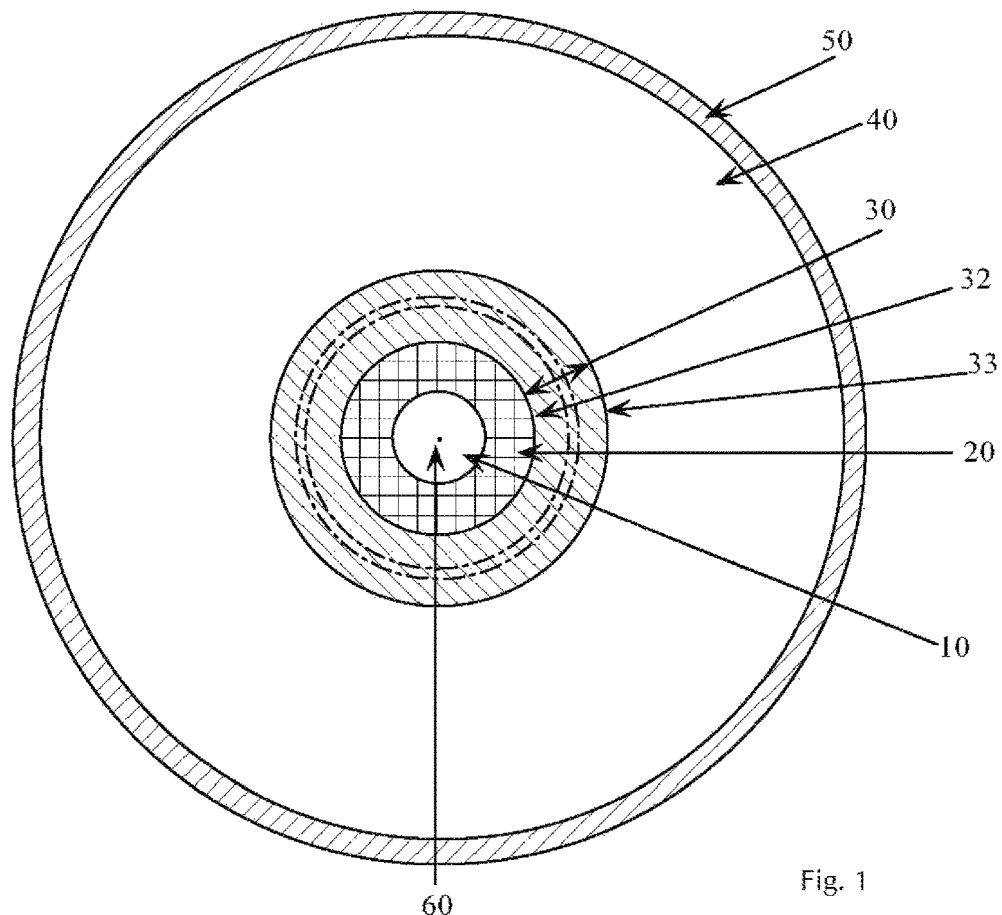
Figure 2:
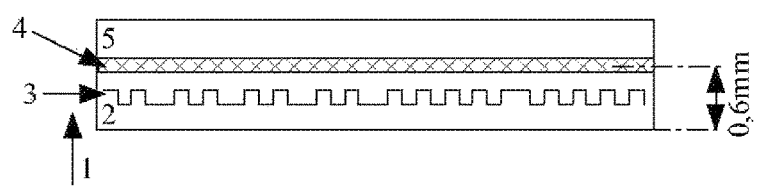
Figure 3:
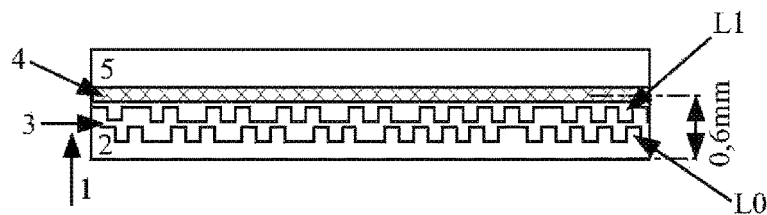

FIG. 1 illustrates a distribution of various parts of the optical storage medium, which has a central hole 10 arranged around a central axis 60 and consists of a burst cutting area 20, a lead-in area 30, which in this case of abstraction, for simplification of the description of the present invention, contains also the areas such as a table of contents—TOC, a power calibration area—PCA, a recording management area—RMA and the burst cutting area—BCA. The depicted optical storage CD or DVD medium further contains an inner edge 32 of the lead-in area, an outer edge 33 of the lead-in area 30, an area 40 for data recording and a lead-out area 50. After creating an audio CD and/or a film-DVD the recordings on the created optical storage medium have a shape of a spiral. FIG. 2 illustrates a cross-sectional view of a part of a single-sided single-layer optical medium (DVD-R:DVD5), where number 1 marks a direction of a laser beam for reading and/or recording. In the cross sectional view the said single sided optical medium consists of a protective layer 2 made of polycarbonate, a recording layer 3, an adhesive layer 4 and a layer 5 for printing, also of polycarbonate. FIG. 3 illustrates a cross-sectional view of a part of a single-sided dual layer optical medium (DVD-R:DVD9), where number 1 marks a direction of the laser beam for reading and/or recording. The recording layer 3 contains two recording layers L0 and L1.

Figure 4:
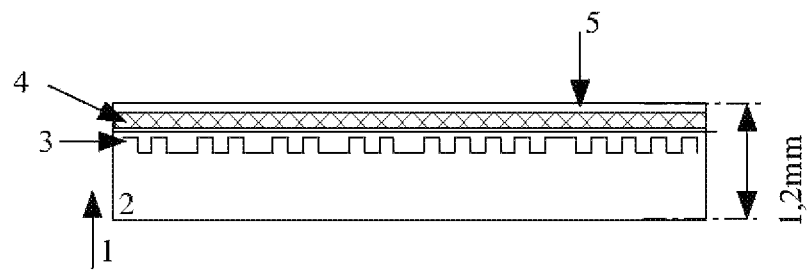

A part of the single-sided optical medium in the cross-sectional view depicted on FIG. 4 represents a CD-R, where marking of the layers is identical with the indications provided in the preceding pictures. The illustrated sections of the one-sided optical media depicted on FIGS. 2 to 4 do not contain a protective element under the present invention.

Figure 5:
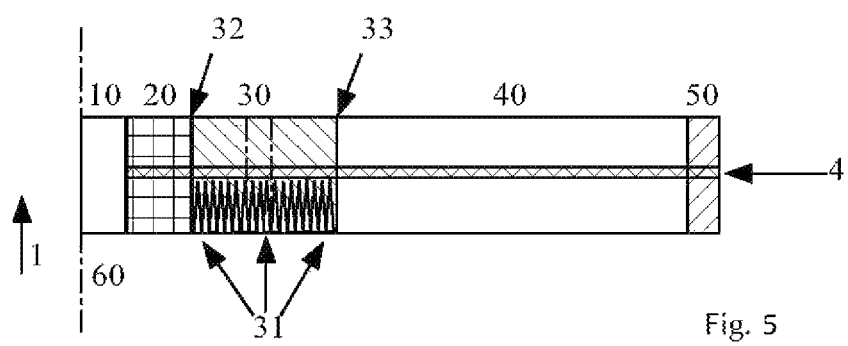
Figure 6:
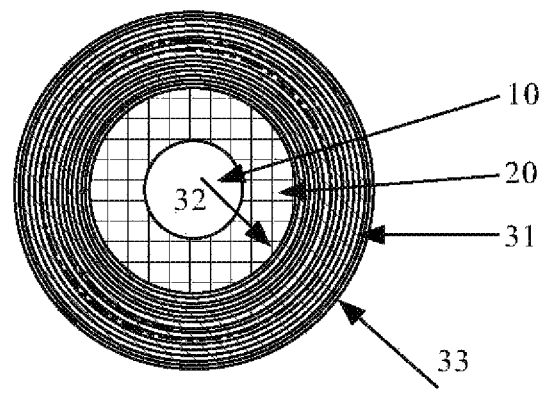

FIG. 5 illustrates the cross sectional view through one half of the optical storage medium with its individual areas, which has in the lead-in area 30 mechanical grooves 31, which profile is in the shape of the letter "V", wherein the grooves have the form of a circle and are arranged closely to each other. The said grooves 31 in the form of concentric circles are created in the lead-in area 30, bounded by the inner edge 32 of the lead-in area 30, where the mechanical groove 31 in the form of the circle with the smallest possible diameter is created and the outer edge 33 of the lead-in area 30, where the mechanical groove 31 in the form of the circle with the largest possible diameter is created, which is clearly visible on FIG. 6, whereas the area 40 for data recording and the lead-out area 50 are not shown herein. The profile of the mechanical groove 31 is in the shape of the letter "V".

Figure 7:
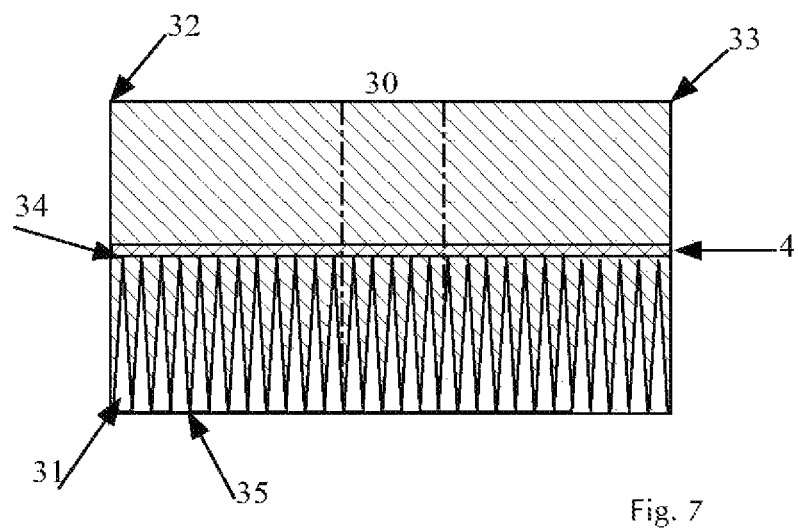

FIG. 7 represents a detail of the lead-in area 30 from FIG. 5. Mechanical grooves 31 in the form of the circle and with the profile of the letter "V" have an edge 35 of the mechanical groove 31 and a peak 34 of the mechanical groove 31, wherein the edge 35 of the mechanical groove 31 is more farther from the adhesive layer 4 and the peak 34 of the mechanical groove 31 is arranged closer to the adhesive layer 4 a can reach up to the adhesive layer 4 and then the mechanical grooves 31 are created through the recording layer 3 or recording layers 3 of the optical storage medium, whereas the recording layers 3 are not shown on this picture.

FIGS. 8 to 12 illustrate a protective element according to the present invention created in various versions. In the lead-in area 30 the grooves 31 with the "V" profile in the form of circles are mechanically created into the protective layer 2. On FIGS. 8 to 10 the peaks 34 of the mechanical grooves 31 do not exceed the recording area 3, and the mechanical grooves 31 in the form of circles are created from the largest possible diameter of the circle of the groove 31 so as not to exceed the inner part of the outer edge 33 of the lead-in area 30. In sequence, other grooves 31 in the form of the circle are mechanically created towards the central axis 60 up to the inner edge 32 of the lead-in area 30. The density of the grooves has to be such that the edges 35 of the mechanical grooves 31 touch each other on the level of the protective layer 2 and to avoid creating an area between them undamaged by the grooves 31. Mechanical grooves 31 are created by a mechanical element, which creates the profile of the groove 31 in the shape of the letter "V".

When creating the grooves 31, by a mechanical tool of such a shape so that to create the profile of the groove 31 in the shape of the letter V, it may also be proceeded in the opposite direction, i.e. from the inner edge 32 of the lead-in area 30 up to the inner part of the outer edge 33 of the lead-in area 30.

Example 2

Figure 8:
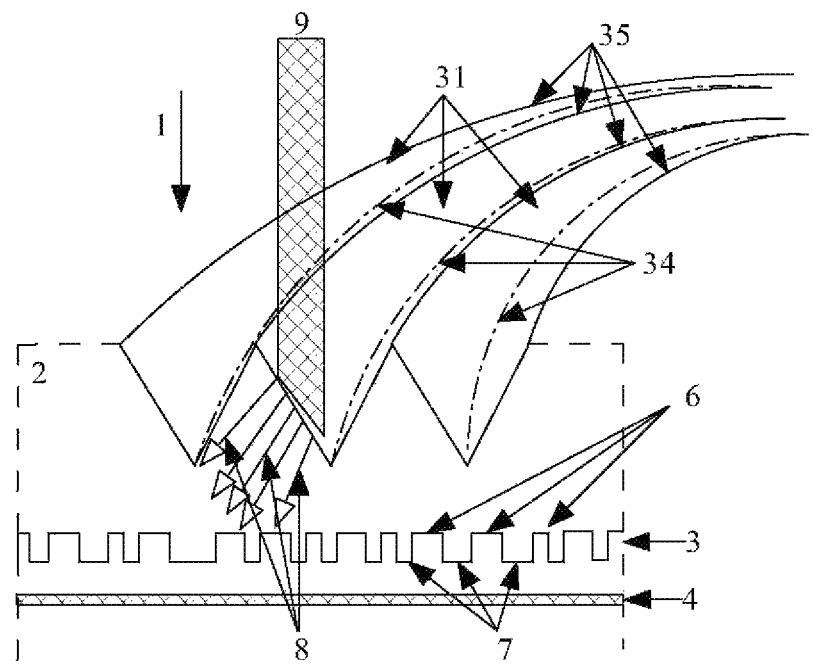
Figure 9:
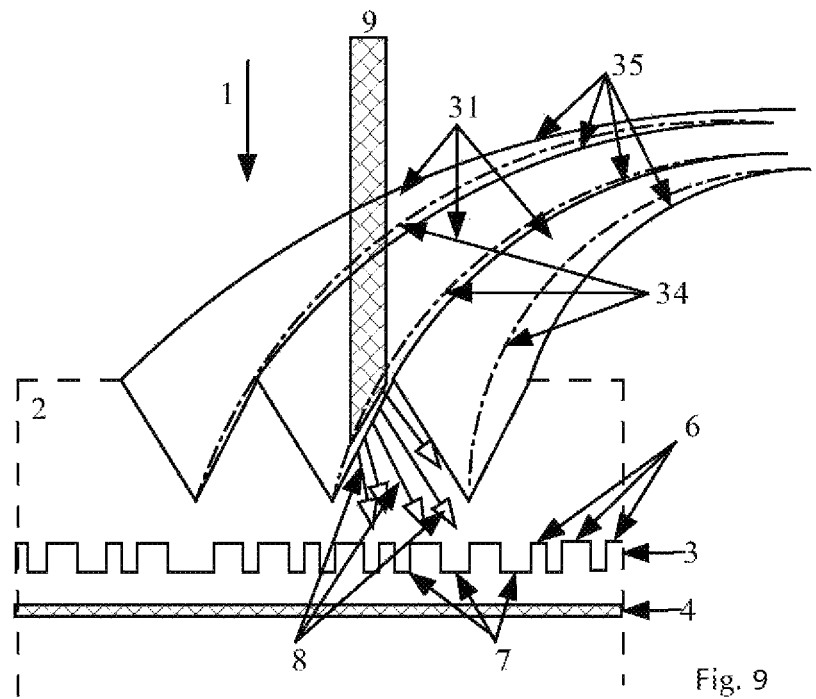
Figure 10:
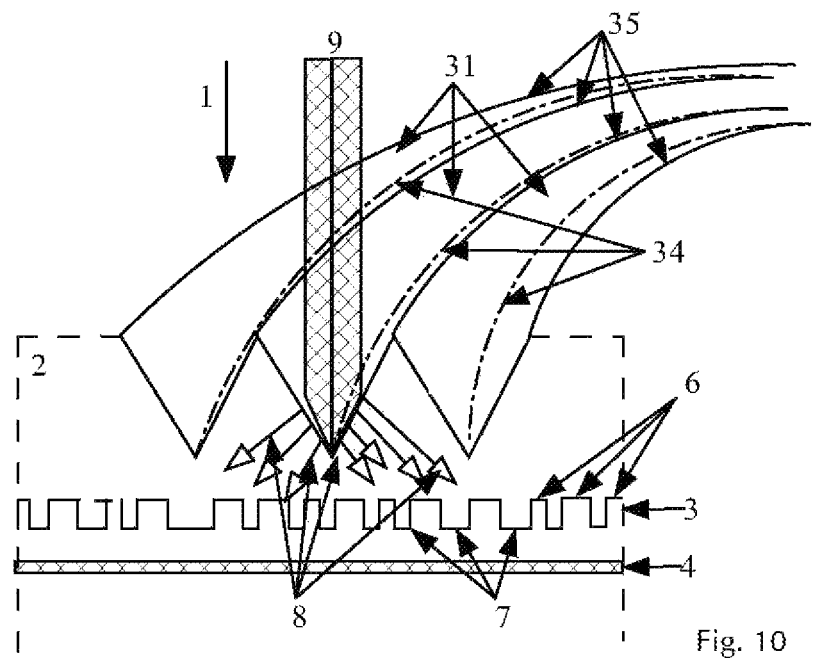

FIGS. 8 to 10 illustrate a section of a part of the lead-in area 30 of a single sided optical medium provided with the mechanically created grooves 31, which have the form of the circle and the profile of the letter V. The peaks 34 of the grooves 31 do not extend the recording layer 3, but are positioned in the protective layer 2. The laser beam 9 of a reading device has the direction 1 when reading the recording, whereas the recordings are recorded in a shape of a spiral. The laser beam 9 if reaching the groove area when loading the recording is forced to move in the circle and the sloping sides of the grooves 31 cause incorrect diffusion 8 of the laser beam 9 and by that the recording becomes unreadable for external as well as built-in CD, DVD drives of computers. The recording is readable only for commercially manufactured CD, DVD players or players with backward compatibility for reading film DVD and/or digital audio CD carriers. The device, which by means of the laser beam 9 in an attempt to load recordings in the lead-in area 30 along the spiral, passing through the individual grooves 31 in the form of the circle with the "V" profile and is unable to load the contents correctly due to incorrect scattering 8 of the laser beam 9 from the recording area 3. The commercially manufactured digital audio CD player and/or DVD-CD players with backward compatibility skip the said unreadable land of the lead-in area 30 when loading and play the audio contents of the digital audio CD.

Example 3

Figure 11:
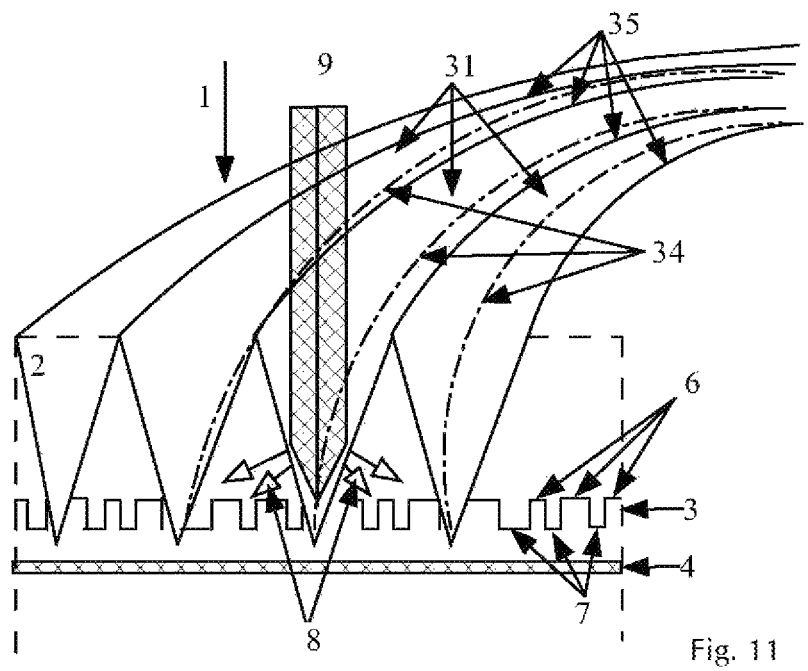
Figure 12:
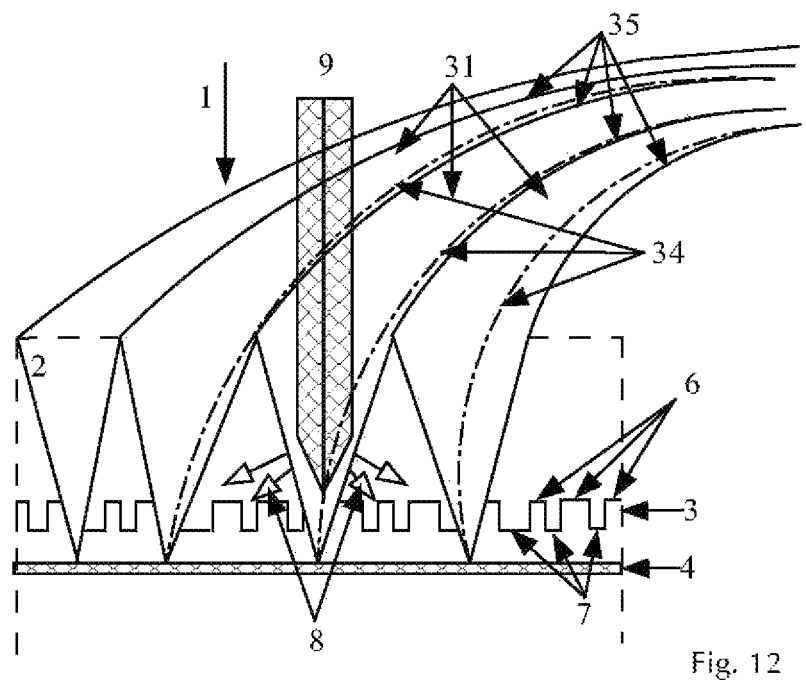

FIG. 11 illustrates an exemplary embodiment of the protective element on the recorded optical storage medium, where the peaks 34 of the grooves 31 created by the mechanical element extend to the recording layer. After creating the digital audio CD the recordings on the created optical storage medium have the shape of a spiral. In the lead-in area 30 we apply the protective element in the form of mechanical grooves 31 with the profile of the letter V in the form of concentric circles into the protective layer 2 in such a way that the peaks 34 of the mechanical grooves 31 extend to the recording layer 3, see FIG. 11. Since the peaks of the grooves are positioned in the recording layer, the recording pits 6 and lands 7 between data, which together form the recording data 6 and 7, are damaged. The sloping sides of the grooves 31 provide incorrect scattering 8 of the laser beam during loading in the lead-in area 30 by the laser beam 9 of the device as well as provide incorrect reading of the recordings in the recording layer 3, recorded in the spiral shape. The device, which in the attempt to load the recordings in the lead-in area 30 along the spiral, passes by means of the laser beam 9 through the individual grooves 31 in the form of the circle with the "V" profile and is unable to load the contents correctly due to incorrect scattering of the laser beam 8 from the recording area 3 as well as due to damage of the recording data 6 and 7 in the recording layer 3. The commercially manufactured digital audio CD player or the DVD-CD or BlueRay player with the backward compatibility skips the said lead-in area 30 when loading and plays the audio contents recorded on the digital audio CD. Thus modified digital audio CD is unreadable in DVD-CD drives of computers.

Example 4

After creating a digital audio-CD and/or film-DVD recordings on the created optical storage medium have the spiral shape. We apply the protective element in the "Lead-in" area 30, the mechanical grooves in the form of the circle of the "V" profile 31 into the protective layer 2 in such a way that the peaks 34 of the mechanical grooves will be created through the recording layer 3 up to the adhesive layer 4, see FIG. 7, FIG. 12, When loading the contents the identical effect, as described in Example 3, occurs. The commercially manufactured film-DVD player or DVD-CD player or BlueRay player with backward compatibility skips the said unreadable lead-in area 30 when loading and plays the audiovisual contents recorded on the film-DVD. In the devices, such as DVD-CD drives of computers thus modified film-DVDs are unreadable.

Example 5

Figure 13:
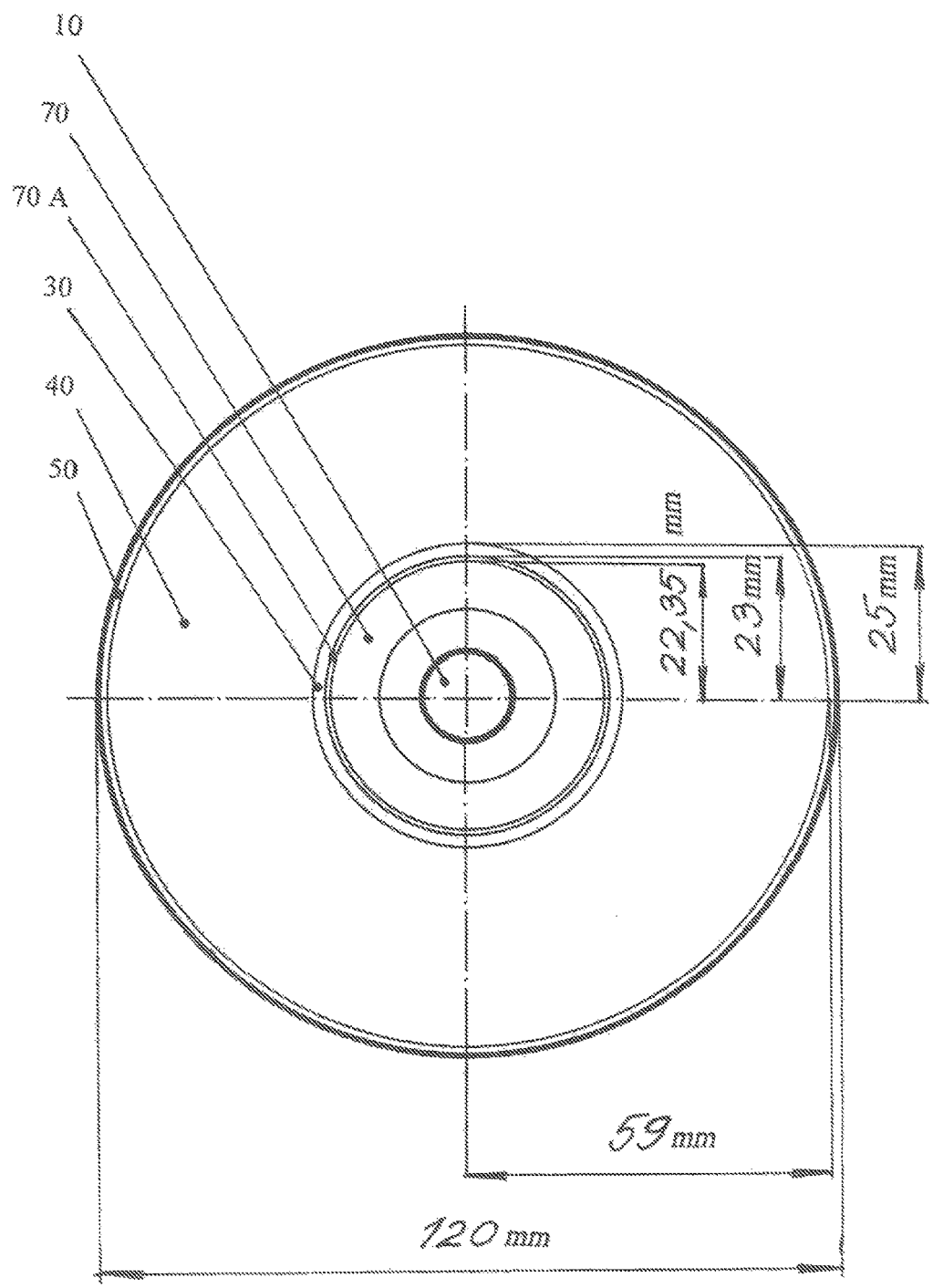
FIG. 13 depicts a design of a CD—state of the art

FIG. 13 depicts a CD according to the state of the art. The CD can be played in CD, DVD and BlueRay players as well as in internal and external drives of personal computers (PC). The contents of the data area can be in the PC environment decoded, copied, stored on the internal and external hard discs, copies by means of burning can be made and the like. 10 marks the central hole, 70—is the "PCA" and 70a—is the "PM" area. 30 marks the lead-in area. PCA 70 and PMA 70a together form a system partition for users. 40—marks the data area, 50 marks the lead-out area.

FIG. 15 depicts a section of a non-standard audio disc according to the present invention manufactured by moulding. The said non-standard audio disc, which is playable only in branded CD, DVD and BlueRay players and also in the branded in-car players consists of identical areas as the standard CD depicted on FIG. 13, with the difference that PCA 70 and PMA 70a zones are replaced by the zone 80 of the mechanical protection, which partially extends to the lead in area 30. In the zone 80 of the mechanical protection a set of mechanical grooves 31 in the form of concentric circles with the profile of the letter "V" is formed. The said grooves have peaks and edges and the groove with the largest possible diameter of the circle is partially in the lead-in area 30 and the groove 31 with the smallest possible diameter of the circle is arranged on the inner edge of the zone 80 of the mechanical protection. The grooves are arranged closely to each other in such a way that their upper edges touch each other. The data area 40 is identical with the data area 40 on pressed standard CD-ROMs. Likewise, the lead out area 50 of the non-standard video disc is identical with the lead out area 50, on pressed standard CD-ROMs.

The mechanical protection against loading and copying can be created by a die, which press into the finished matrix the set of concentric circles with a profile of the letter "V" into the zone 80 of the mechanical protection and partially into the lead-in area 30. Grooves of the zone 80 of the mechanical protection can be created also by laser, while creating the glassmater (the glass plate for matrix fabrication), in such a way that in zone 80 of the mechanical protection and partially in the lead-in area 30 of the glassmater, the laser creates the protective element in the form of concentric circles. Subsequently, the matrix is created, which include the same concentric circles in the same area and by pressing from this matrix are manufactured the non-standard audiodiscs, that cannot be loaded into the CD or DVD drives of the personal computers.

Example 6

Figure 14:
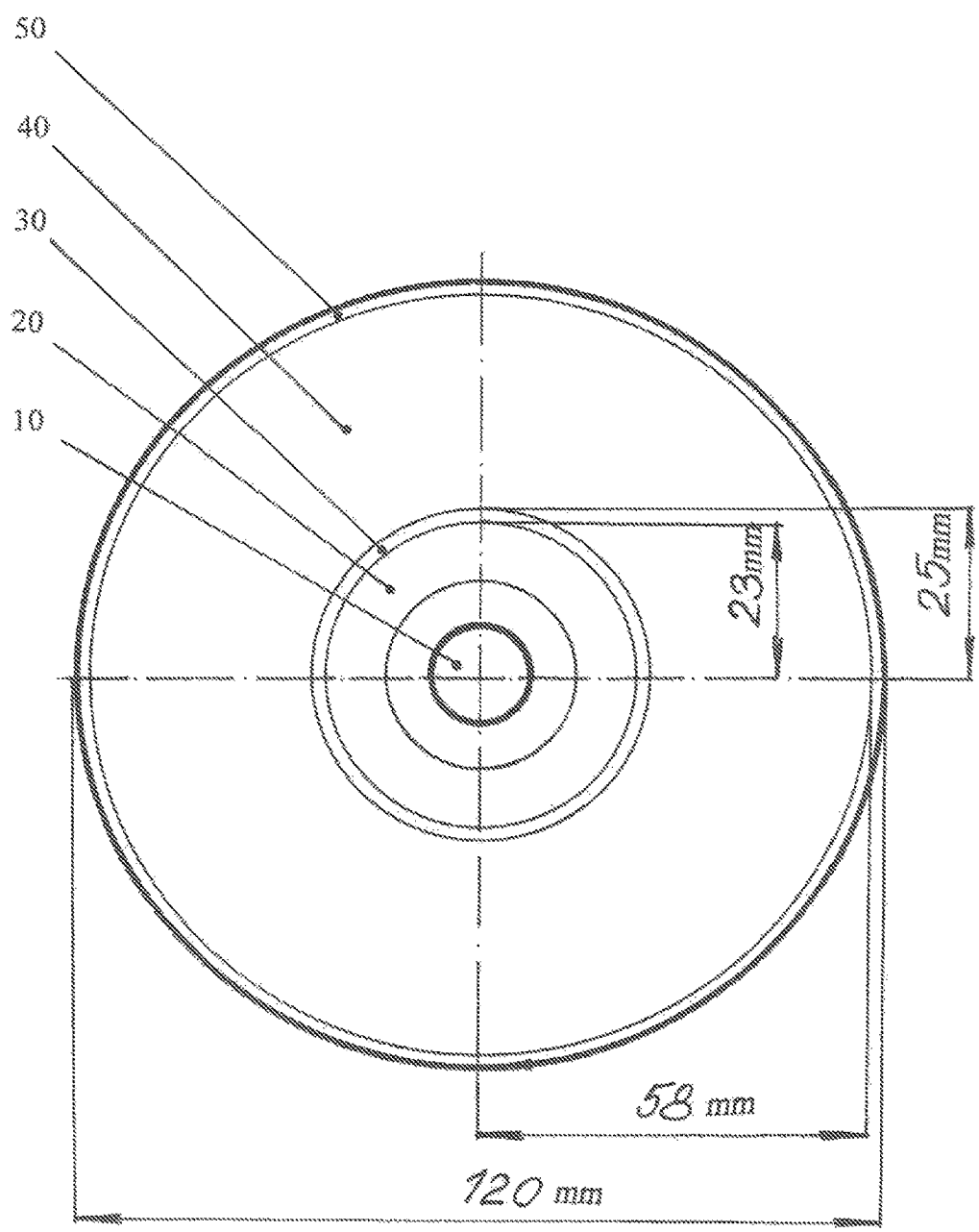
FIG. 14 depicts a design of a DVD—state of the art

FIG. 14 illustrates a standard optical disc DVD-R, on which a film can be burned in a computer, i.e. the video as well as the audio recording. It is a recordable optical disc DVD-R. This standard medium contains the central hole 10, the "burst cutting area" 20, the said area is located within the radius of 23 mm. The lead-in area 30 has the radius up to 25 mm, 40—data area is within the radius of 58 mm and the lead out area 50 is the last one.

FIG. 16 depicts a section of a non-standard video disc according to the present invention manufactured by pressing from a matrix according to the present invention. The said video disc is playable only in branded DVD, CD and BlueRay players. The difference from the standard disc DVD-R disc is that the "burst cutting area"—20 according to FIG. 14 is replaced by the zone 80, in which the mechanical protection against loading and playing of the video disc in personal computers is applied and which partially extends to the lead-in area 30. The said zone 80 of the mechanical protection is provided with a set of mechanical grooves in the form of concentric circles with the profile of the letter "V" as described above.

The data area 40 (FIG. 16) on the non-standard video disc is identical with the data area of moulded standard DVD-ROMs. Also the lead out area 50 is identical with the lead out area 50 on pressed standard discs DVD-ROMs.

The mechanical protection against loading and copying can be created by a die, which press into the finished matrix the set of concentric circles with a profile of the letter "V" into the zone 80 of the mechanical protection and partially into the lead-in area 30. Grooves of the zone 80 of the mechanical protection can be created also by laser, while creating the glassmater (the glass plate for matrix fabrication), in such a way that in zone 80 of the mechanical protection and partially in the lead-in area 30 of the glassmater, the laser creates the protective element in the form of concentric circles. Subsequently, the matrix is created, which include the same concentric circles in the same area and by pressing from this matrix are manufactured the non-standard videodiscs, that cannot be loaded into the CD or DVD drives of the personal computers.

INDUSTRIAL APPLICABILITY

A method of protection on optical storage media, which are standardly compiled in the format of the digital audio CD and the film-DVD can be utilised in production of audio works and/or audiovisual works by music and/or film production companies, manufacturers and/or authors, in distribution of the said works, sale as well as in DVD rentals. A recording on the optical storage medium can have contents of various nature: political, military, medical, erotic, scientific, religious, educational and other with a certain level of privacy: (e.g.: reserved, confidential, secret, top secret) according to requirements and/or needs of the author of the work who needs to protect their copyrighted work.

In case of application of the present invention the authors of audio works or audiovisual works or music or film distribution companies and/or producers of commercial digital audio CD and/or DVD and/or BlueRay-DVD-CD players and/or film-DVD rentals will not lose their profits, because by application of the present invention after creating the digital audio CD and/or film DVD the maximum protection against misuse of compact audio-CDs and film DVDs in CD and DVD drives of personal computer shall be provided.

What is claimed is:

1. A method of protection of recorded storage media, such as an audio CD and a film DVD against their unauthorised copying and infringement of copyright by application of a protection element onto an optical storage medium, which in a cross-section contains a protective layer of polycarbonate, a recording layer with one or more recording layers, an adhesive layer and a printing layer and which contains a central hole arranged around the central axis, a lead-in area bordered by an outer edge and an inner edge, area for data recording and a lead-out area, wherein between the inner edge and the outer edge of the lead-in area, are created grooves in the form of concentric circles around a central axis with a profile of the letter "V" into a protective layer, wherein the said grooves have peaks and edges and are created in such a way that the groove with the largest possible diameter of the circle does not exceed the inner part of the outer edge and the groove with the smallest possible diameter of the circle does not exceed the inner edge of the lead-in area, wherein the density of the grooves is such that the edges of the grooves touch each other on the surface of the protective layer and between the individual edges of the grooves there is no area undamaged by the grooves.

2. A method according to claim 1, wherein the grooves are created into the protective layer, wherein the peaks of the grooves extend at maximum to the depth up to the adhesive layer.

3. A method according to claim 1, wherein the peaks of the grooves extend only to the protective layer.

4. A method according to claim 1, wherein the peaks of the grooves extend to the recording layer.

5. A method according to claim 1, wherein the peaks of the grooves exceed the recording layer towards the adhesive layer.

6. A method according to claim 1, wherein the grooves are created by mechanical means, by pressing or burned by laser.

7. A recorded optical storage medium, such as an audio CD and a film DVD provided with a protective element, for protection against unauthorised copying and infringement of copyright, created by a method according to claim 1, the optical storage medium in the cross-section containing the protective layer of polycarbonate, the recording layer with one or more recording layers, the adhesive layer and the printing layer and which contains a central hole arranged around the central axis, the lead-in area bordered by the outer edge and the inner edge, the area for recording data, and the lead-out area, wherein the protective element is formed by a set of grooves in the form of a circle around the central axis with the profile of the letter "V", wherein the said grooves have peaks and edges and the groove with the largest possible diameter of the circle is arranged on the inner part of the outer edge of the lead-in area and the groove with the smallest possible diameter of the circle is arranged on the inner edge of the lead-in area and the density of the grooves is such that the edges of the grooves touch each other on the surface of the protective layer and between the individual edges of the grooves there is no area undamaged by the grooves.

8. A recorded optical storage medium according to claim 7, wherein the grooves are created into the protective layer, wherein the peaks of the grooves extend at maximum to the depth up to the adhesive layer.

9. A recorded optical storage medium according to claim 7, wherein the peaks of the grooves extend only to the protective layer.

10. A recorded optical storage medium according to claim 7, wherein the peaks of the grooves extend to the recording layer.

11. A recorded optical storage medium according to claim 7, wherein the peaks of the grooves exceed the recording layer towards the adhesive layer.

12. A non-standard optical audio disc with a protective element against loading and playing in personal computers created by a method of protection of recorded storage media, such as an audio CD and a film DVD against their unauthorised copying and infringement of copyright by application of a protection element onto an optical storage medium, which in a cross-section contains a protective layer of polycarbonate, a recording layer with one or more recording layers, an adhesive layer and a printing layer and which contains a central hole arranged around the central axis, a lead-in area bordered by an outer edge and an inner edge, area for data recording and a lead-out area, wherein between the inner edge and the outer edge of the lead-in area, are created grooves in the form of concentric circles around a central axis with a profile of the letter "V" into a protective layer, wherein the said grooves have peaks and edges and are created in such a way that the groove with the largest possible diameter of the circle does not exceed the inner art of the outer edge and the groove with smallest possible diameter of the circle does not exceed the inner edge of the lead-in area, wherein the density of the groove is such that the edges of the grooves touch each other on the surface of the protective layer and between the individual edges of the grooves there is no area undamaged by the grooves, manufactured by pressing from a matrix containing the lead-in area, the data area and the lead-out area wherein in the area with the radius from 18.00+1 mm to 23.50+1 mm is provided with a zone of the mechanical protection, which contains a set of grooves in the form of concentric circles with the profile of the letter "V", which are arranged closely to each other in such a way that their upper edges touch each other.

13. A non-standard optical video disc with a protective element against loading and playing in personal computers created by a method of protection of recorded storage media, such as an audio CD and a film DVD against their unauthorised copying and infringement of copyright by application of a protection element onto an optical storage medium, which in a cross-section contains a protective layer of polycarbonate, a recording layer with one or more recording layers, an adhesive layer and a printing layer and which contains a central hole arranged around the central axis, a lead-in area bordered by an outer edge and an inner edge, area for data recording and a lead-out area, wherein between the inner edge and the outer edge of the lead-in area, are created grooves in the form of concentric circles around a central axis with a profile of the letter "V" into a protective layer, wherein the said grooves have peaks and edges and are created in such a way that the groove with the largest possible diameter of the circle does not exceed the inner part of the outer edge and the groove with the smallest possible diameter of the circle does not exceed the inner edge of the lead-in area, wherein the density of the grooves is such that the edges of the grooves touch each other on the surface of the protective layer and between the individual edges of the grooves there is no area undamaged by the grooves, manufactured by pressing from the matrix containing the lead-in area the data area and the lead-out area wherein in the areas with the radius from 18.00+1 mm to 23.50+1 mm is provided with the zone of the mechanical protection, which contains a set of grooves in the form of concentric circles with the profile of the letter "V", which are arranged closely to each other in such a way, that their upper edges touch each other.

14. A matrix for pressing non-standard optical audio discs according to claim 12, with a protective element against loading and playing in personal computers containing the lead-in area, the data area and the lead-out area wherein in the area with the radius from 18.00+1 mm to 23.50+1 mm is provided with the zone of the mechanical protection, which contains a set of grooves in the form of concentric circles with the profile of the letter "V", which are arranged closely to each other in such a way, that their upper edges touch each other.

15. A matrix for pressing non-standard optical video discs according to claim 13, with a protective element against loading and playing in personal computer, containing the lead-in area, the data area and the lead-out area wherein in the area with the radius from 18.00+1 mm to 23.50+1 mm is provided with the zone of the mechanical protection, which contains a set of grooves in the form of concentric circles with the profile of the letter "V", which are arranged closely to each other in such a way that their upper edges touch each other.

* * * * *